S. A. GREGG.
CHURNS.
No. 184,370.  Patented Nov. 14, 1876.
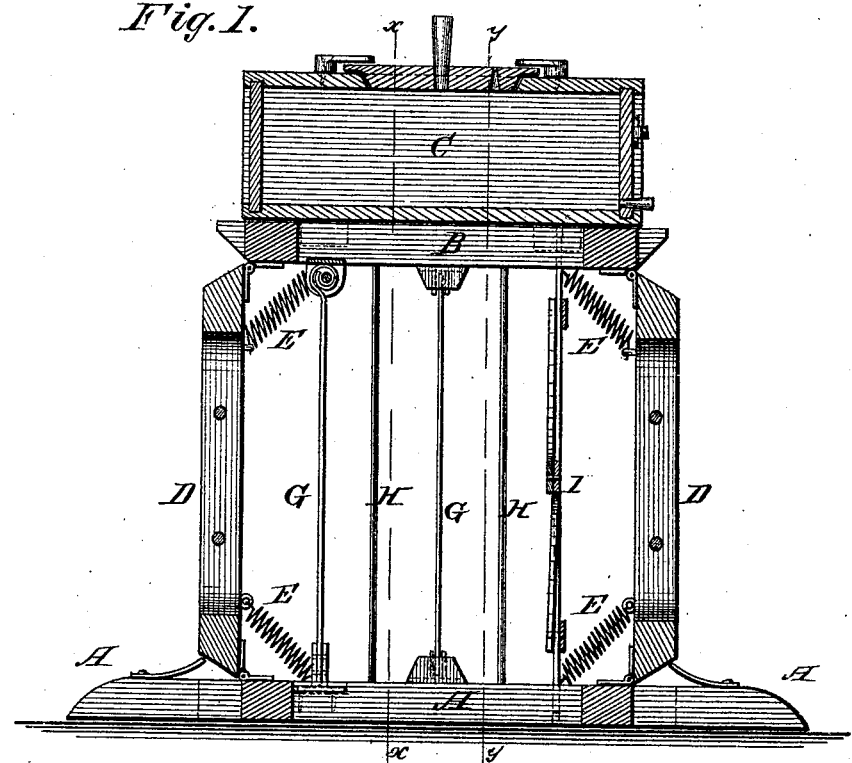
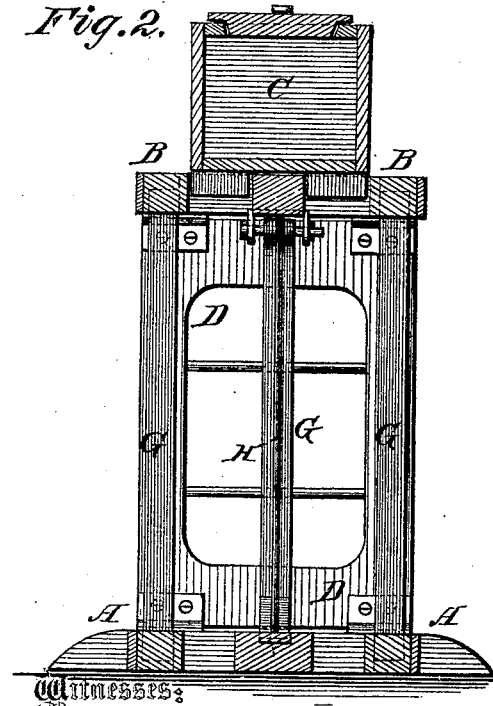
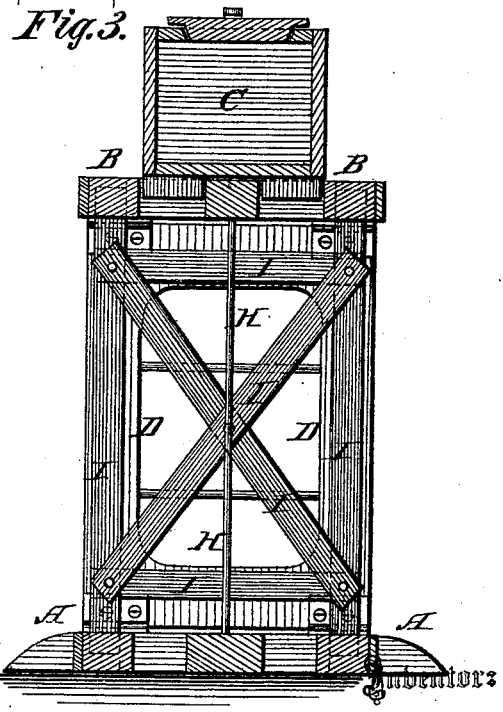
Witnesses:
P. C. Dieterich
Wm. ...
Inventor:
Solon A. Gregg.
Per: C. H. Watson & Co. Attorneys.

UNITED STATES PATENT OFFICE.

SOLON A. GREGG, OF ONEIDA, NEW YORK.

IMPROVEMENT IN CHURNS.

Specification forming part of Letters Patent No. 184,370, dated November 14, 1876; application filed August 30, 1876.

*To all whom it may concern:*

Be it known that I, SOLON A. GREGG, of Oneida, in the county of Madison and State of New York, have invented certain new and useful Improvements in Churns; and I do hereby declare that the following is a full, clear, and exact description thereof, which will enable others skilled in the art to which it appertains to make and use the same, reference being had to the accompanying drawing, and to the letters of reference marked thereon, which form a part of this specification.

My invention relates to churns; and it consists in the construction and arrangement of an oscillating spring structure, upon which the churn-box is supported, and by which the churn receives an oscillating motion, as will be hereinafter more fully set forth.

In the annexed drawing, Figure 1 is a central vertical section. Fig. 2 is a transverse section on line $x\,x$, Fig. 1; and Fig. 3 is a transverse section on line $y\,y$, Fig. 1.

A represents the bottom or bed frame of my invention, and B is the top frame, upon which latter the churn-box C is supported. The two frames A and B are connected by means of end frames D D, hinged to them, as shown. The upper and lower ends of the end frames D are beveled, so as to allow of their oscillation back and forth, carrying with them the top frame B. Springs are introduced between these frames in such a manner as to hold the structure in an upright position, and when moved toward either end, the structure will be brought back by the springs. Such springs may be arranged in various ways, some of which I have shown in the drawing. E E represent spiral springs, connecting the end frames D D at the top and bottom with the top and bottom frames. G G are flat springs, connecting the top and bottom frames, the connections being either rigid or loose, as desired. H H represent spring-wire rods, connecting the top and bottom frames, and accomplishing the same result. I represents a spring-frame, which may be substituted for the frame D at each end of the structure. Any of these or other springs may be arranged to effect the same object, or any combination of them may be used, only so that a sufficient number is used to produce the result desired.

Having thus fully described my invention, what I claim as new, and desire to secure by Letters Patent, is—

An elastic and vibrating churn-support, with perpendicular springs, and hinged joints, with diagonal coils, as and for the purpose set forth.

In testimony that I claim the foregoing as my own I affix my signature in presence of two witnesses.

SOLON A. GREGG.

Witnesses:
    E. P. CURTIS,
    S. H. STAFFORD,
    W. E. ANTHONY.